March 9, 1965   D. M. BARRETT ETAL   3,173,009
SPOT FILMER WITH RADIATION SHIELD
Original Filed Dec. 28, 1961
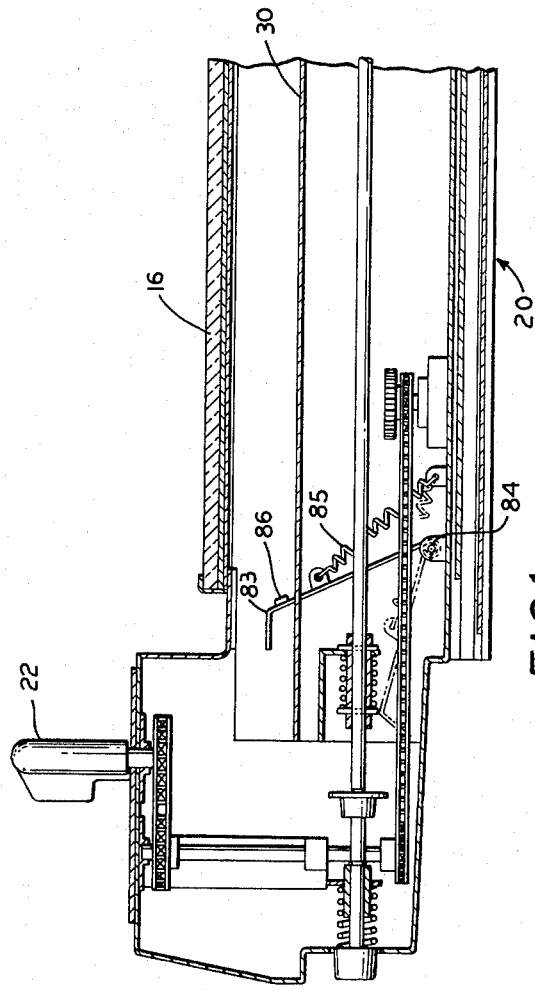
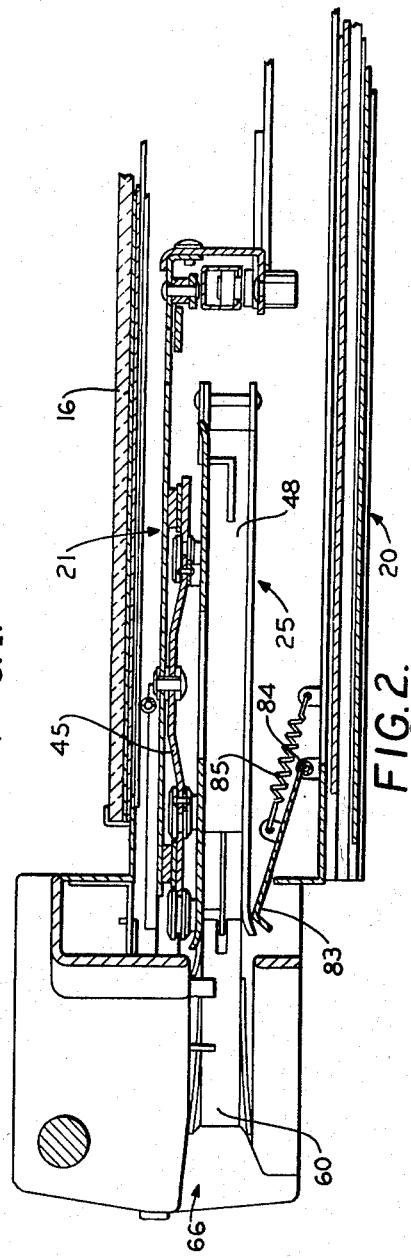
INVENTORS.
DAVID M. BARRETT
MICHAEL HURA
BY
ATTORNEYS.

3,173,009
SPOT FILMER WITH RADIATION SHIELD

David M. Barrett, Lyndhurst, and Michael Hura, Cleveland, Ohio, assignors to Picker X-Ray Corporation, Waite Manufacturing Division, Inc., Cleveland, Ohio, a corporation of Ohio
Original application Dec. 28, 1961, Ser. No. 165,709. Divided and this application Nov. 19, 1962, Ser. No. 238,482
6 Claims. (Cl. 250—66)

This invention pertains to medical X-ray apparatus and more specifically to that class of radiographic devices which are now known in the art as spot filmers.

This application is a division of David M. Barrett et al. application S.N. 165,709 filed December 28, 1961, entitled Spot Filmer.

A medical X-ray table is generally equipped with a device known as a spot filmer. These spot filmers include a fluoroscopic screen, or in the alternative, an image intensification tube and an associated optical system or closed circuit television arrangement. A spot filmer also includes a mechanism for selectively and sequentially positioning a photographic film carried in a film cassette for a series of radiographic exposures.

In one class of spot filmer, a motor driven carriage is provided which selectively advances a cassette to a radiographic position, and thereafter moves a cassette through a predetermined sequence of positions. One mechanism of this class is described in United States Letters Patent 2,668,913, issued February 9, 1954, under the title "Spot Filmer," while a more recent design is described and claimed in United States Letters Patent 2,767,323 issued October 16, 1956, under the title "Serial Filmer." This invention is directed to an improved spot filmer which has certain definite advantages over those described and claimed in these two patents.

One of the disadvantages of the spot filmers described and claimed in these two patents is that they are of the so-called "top" loading type. That is, a cassette, when positioned in the carriage, is inserted through a loading aperture in the top of the spot filmer. This loading aperture, in most spot filmers of the so-called "top" loading type, is toward the rear of the housing. When an image intensification tube is secured to the spot filmer, loading becomes quite difficult and awkward since the operator must reach around the tube and over the table and patient to position the cassette.

With this invention, a spot filmer of the so-called "front" loading class is provided. In the mechanism of this invention, loading—and unloading—of a cassette into the cassette carriage is accomplished through a simple, direct, rectilinear movement through a loading aperture in the forward end of the spot filmer. Loading only requires inward pressure until the cassette is in place when it locks automatically while simply pressing a button results in ejection of the cassette. The complete mechanism is described in greater detail in the patent application referenced above. Certain features of the mechanism are claimed in the following other copending applications:

(1) Spot Filmer Drive System, filed November 19, 1962, Serial Number 238,558.

(2) Carriage for Front Loaded Spot Filmer, filed November 19, 1962, Serial Number 238,571.

With spot filmers the cassette load opening is generally positioned such that scatter radiation from an X-ray exposure can pass, and in the past has passed, through the opening. This is undesirable with all spot filmers but with a front loading spot filmer this is highly dangerous because the radiation is often emitted directly at the operator. With most spot filmers one may readily both see and fill the cassette carriage when it is in the load position. With a front loaded spot filmer, however, one cannot readily discern whether or not the carriage is positioned for loading. Insertion of a cassette through the load opening when the carriage is not positioned for loading can result in damage to the structure on subsequent movement of the carriage.

The features of this invention reside in a combination radiation shield and cassette stop which is provided and which overcomes these listed disadvantages. That is, it prevents insertion of a cassette through the front load opening at any time except when a carriage is positioned adjacent the load opening. At other times this shield provides a scatter radiation shield to protect the operator from stray radiation emanating from the front load opening.

Other features and a fuller understanding of the invention may be had by referring to the following description and claims taken in conjunction with the accompanying drawings, in which:

FIGURE 1 is an enlarged fragmentary sectional view of a spot filmer showing the novel shield of the invention; and, FIGURE 2 is a fragmentary sectional view of the device as seen from a plane paralleling the plane of FIGURE 1.

Referring now to the drawings, a spot filmer frame is shown generally at 20. A cassette carriage shown generally at 21 is mounted in the frame on tracks 30, only one of which is visible in FIGURE 1. The carriage is mounted for rectilinear movement to and from a loading and unloading position of FIGURE 2 near the front of the spot filmer. The carriage is movable from the loading position to a storage position at the rear of the spot filmer, not shown. The carriage 21 is advanced selectively and sequentially from the storage position to each exposure position of a selected series.

When a selector knob 22 is placed in a selected position and thereafter a drive mechanism is repeatedly actuated, the carriage will selectively travel to the appropriate positions under a fluoroscope screen 16. This positioning provides selective exposure of part or all of a photographic film carried by the carriage 21. The cross carriage has a pair of downwardly extending cassette-gripping flanges, one of which is shown at 48. These flanges serve to support a cassette when it is positioned in the cross carriage. In order to assure proper positioning of the cassette in each of the positions of the device, it is important to have the cassette-supporting flanges 48 symmetrical about the longitudinal centerline of the cross carriage, 25. A jaw coordinating link 45 is provided which serves to maintain the cassette supporting flanges 48 equidistant from the cross carriage centerline plane at all times so as to properly locate a cassette, transversely speaking, in the cross carriage.

A pair of cassette guide chutes, one of which is shown at 60, are provided on the forward end of the carriage 21. These chutes are pivotally connected to the forward part of the carriage. A side elevational view of the chute 60 is visible in FIGURE 2 and the other chute, not shown, is a mirror image of the chute 60. Each is sized for guiding sliding engagement with a cassette upon insertion of a cassette into the carriage. The cassette is inserted, or ejected, through a front load opening 66.

The feature of this invention resides in a novel elongated plate-like shield 83. This radiation shield is pivotally mounted at 84 on the bottom of the spot filmer frame 20. The shield is transverse to the spot filmer such that the shield and pivot parallel the load opening and the carriage path of travel. When the carriage 21 moves rearwardly from the load-unload position, a spring 85 biases the shield 83 against a stop 86 and into a shield position, solid lines in FIGURE 1. This position is between the carriage and the opening 66. When the carriage is moved forwardly along its path established by track 30, the carriage will come into contact with the radiation shield 83 and pivot the shield out of the shield position to a retracted position out of the path of carriage travel. This retracted position is shown in phantom FIGURE 1 and in FIGURE 2. When the shield 83 is in its shield position, it extends transversely across the leading opening 66 to prevent radiation from emanating from the opening. Additionally, the shield has another purpose in that it prevents the insertion of a cassette through the opening 66 at all times except when the carriage 21 is in the load and unload position. This is true because at these times when the carriage is not adjacent the opening 66, the shield is against the stops 86 blocking the insertion of a cassette through the opening.

The invention, then, is believed to comprise a novel radiation shield for closing a spot film load opening when the device is in use. The shield also serves as an obstruction to prevent loading of a cassette into carriage unless the carriage is properly positioned for loading.

What is claimed is:

1. In a spot filmer having a frame and an opening for receiving a cassette the combination of:
    (a) a cassette carriage movably mounted on the frame;
    (b) a radiation shield of X-ray absorbing material movably carried within the spot filmer and positioned near said opening;
    (c) means maintaining the shield across the load opening and between the opening and the carriage at all times other than when shifted to a storage position on movement of the carriage to a load position; and,
    (d) means on said carriage for shifting the shield to the storage position upon movement of the carriage to the load position.

2. In a spot filmer having an opening for receiving a cassette the combination of:
    (a) a cassette carriage movably mounted in the spot filmer;
    (b) a radiation shield of X-ray absorbing material pivotally mounted within the spot filmer and positioned near said opening;
    (c) biasing means maintaining the shield across the load opening whereby to prevent scatter radiation from passing through the opening and between the opening and the carriage at all times other than when shifted to a storage position on movement of the carriage to a load position; and,
    (d) means on said carriage for shifting the shield to the storage position upon moving of the carriage to the load position.

3. The device of claim 2 wherein the shield is biased against a stop with the shield between the stop and the load opening at all times other than when the carriage is in the load position whereby the shield obstructs the insertion of a cassette unless the carriage is in said parked position.

4. In a spot filmer including a front load opening and a carriage movably mounted in the filmer for movement in a path toward and away from the opening the combination of:
    (a) a plate-like X-ray shield of X-ray absorbing material pivotally mounted in the spot filmer and for pivoting about an axis generally paralleling the load opening, said shield being across said path;
    (b) biasing means pivoting the shield away from the opening and against a stop into a position closing the opening and between the opening and the carriage at all times other than when shifted to a storage position on movement of the carriage to a load position; and,
    (c) said carriage being abuttable against the shield on movement toward the opening to shift the shield to the storage position against the action of the biasing means upon shifting of the carriage to the load position.

5. In an X-ray spot filmer, the improvement comprising:
    (a) a frame structure including a load opening;
    (b) a carriage assembly reciprocally mounted on the frame structure;
    (c) power means connected to the assembly to shift the carriage assembly reciprocally to exposure and load positions selectively one at a time;
    (d) X-ray shielding means carried by the frame and movable in response to carriage assembly movement:
        (i) from a shielding position blocking X-radiation from passing through said opening when the assembly is in one of said exposure positions; and,
        (ii) to a storage position permitting loading and unloading access to the assembly through said opening when the carriage is in the load position;
    (e) said X-ray shielding means being in said shielding position at all times other than when shifted to said storage position on movement of said carriage to said load position; and,
    (f) said shield when in said shielding position being between said carriage and said opening.

6. In a spot filmer having a frame and a front load opening, the combination of:
    (a) track means forming a part of the frame and establishing a path toward and away from the opening;
    (b) a carriage assembly mounted on said track means and reciprocal along said track toward means and away from the opening;
    (c) a pivot within the spot filmer and spaced from and parallel with both said path and said opening;
    (d) a shield of X-ray absorbing material pivotally mounted on said pivot and movable:
        (i) from a storage position spaced from the path;
        (ii) to a shielding position across the path and between the carriage assembly and the opening, to close the opening and thereby prevent insertion of a cassette and emission of radiation through said opening;
    (e) means biasing the shield toward the shielding position;
    (f) said frame including stop means abuttable by said shield to locate said shielding position; and,
    (g) said shield being abuttable by said assembly when the assembly is moved to a load position adjacent the opening thereby shifting the shield to the storage position to permit loading and unloading of a cassette.

References Cited by the Examiner

UNITED STATES PATENTS

| | | | |
|---|---|---|---|
| 2,056,279 | 10/36 | Kulich | 250—68 |
| 2,331,586 | 10/43 | Waisco | 250—108 X |
| 2,567,566 | 9/51 | Kizaur | 250—108 X |
| 2,834,890 | 5/58 | Bastin et al. | 250—66 |
| 3,030,508 | 4/62 | Mort et al. | 250—108 X |
| 3,069,544 | 12/62 | Kizaur | 250—66 |

RALPH G. NILSON, *Primary Examiner.*